E. E. NOVOTNY.
METHOD OF MAKING PRINTING PLATE MOLDS.
APPLICATION FILED MAY 20, 1916.
1,356,217.
Patented Oct. 19, 1920.
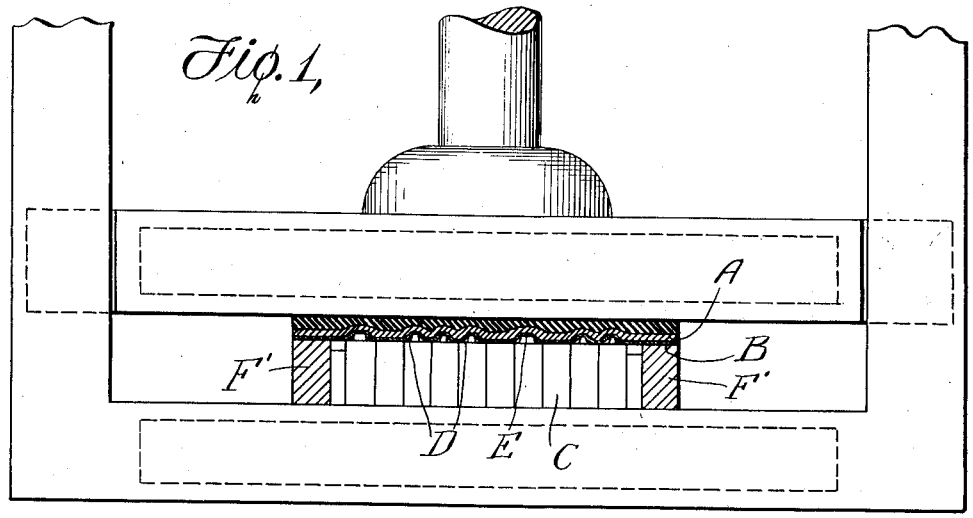
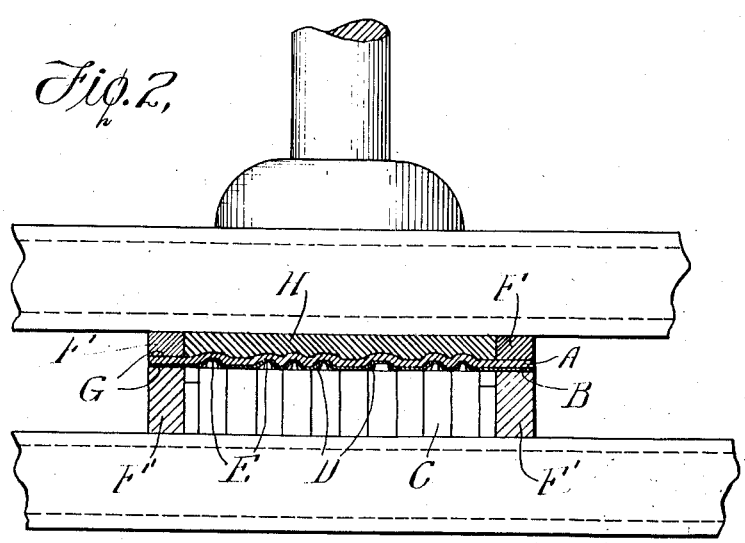
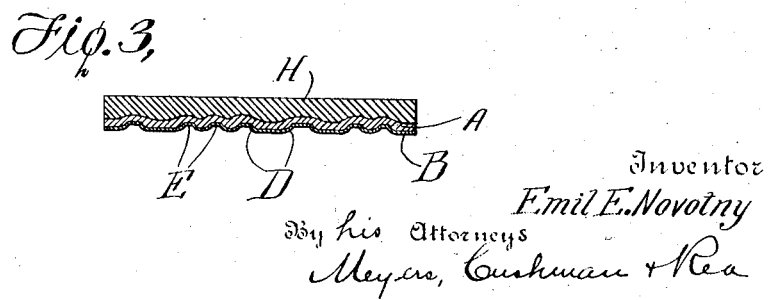
Inventor
Emil E. Novotny
By his Attorneys
Meyers, Cushman & Rea

UNITED STATES PATENT OFFICE.

EMIL E. NOVOTNY, OF RIVERSIDE, ILLINOIS, ASSIGNOR TO J. STOGDELL STOKES, OF MOORESTOWN, NEW JERSEY.

METHOD OF MAKING PRINTING-PLATE MOLDS.

1,356,217.      Specification of Letters Patent.      Patented Oct. 19, 1920.

Application filed May 20, 1916. Serial No. 98,908.

*To all whom it may concern:*

Be it known that I, EMIL E. NOVOTNY, a citizen of the United States, residing at Riverside, in the county of Cook and State of Illinois, have invented certain new and useful Improvements in Methods of Making Printing-Plate Molds, of which the following is a specification.

This invention relates to the method of making a printing plate mold and has particular application to manufacturing a mold or matrix wherein the type impression portion is composed of a relatively thin sheet of metal capable of assuming a condition of plasticity but possessing little ductility, this metal preferably being lead, although other metals such as copper may be used, such type impression sheet or portion having a backing composed of metal having a preferably lower melting point than such type impression sheet or portion.

In carrying out my invention it is my purpose to provide a mold or matrix wherein the type-face forming depressions will be of such depth and accuracy as to produce sharp, clear type faces on a plate made in the mold, the face of the lead mold sheet in which the depressions are formed having well rounded, curved or swelled non-type forming portions which will produce on the printing plate relatively wide strong footings or bases for the type faces. The backing for this lead mold-sheet is preferably cast thereon thus producing a strong, durable, cheap and rigid mold.

With the above recited objects and others of a similar nature in view my invention consists in the method of making a printing plate mold set forth in and falling within the scope of the appended claims.

Figure 1 is a transverse sectional view taken through my improved mold and a conventional form of apparatus in which the mold may be made, and showing one step in the making of the mold.

Fig. 2 is a similar view showing a second step in the making of the mold.

Fig. 3 is a sectional view through the complete mold.

In the practice of my invention I select a very thin lead sheet which is intended to constitute the type receiving impression face or side of the mold, this lead sheet being shown at A in the drawing and may be of any desired thickness say from ten one-thousandths to twenty one-thousandths of an inch. This sheet is preferably electroplated with tin or copper on its front or outer face, the electro-plated coating being indicated at B. This lead sheet is then placed upon a form or block of type, or a relief plate to be reproduced and which is shown at C, and a soft paper backing possessing a certain degree of yieldability, but little resiliency, such as a newspaper sheet is laid on the back of the lead sheet and the latter while imposted on the type form or plate is subjected to heat and pressure or pressure only to form the type depressions. This step of pressure or heat and pressure gives the proper depth and sharpness to the type depressions forming face portions of the mold. After this first step of pressure or heat and pressure the paper sheet is removed and a sheet or blanket which may be composed of rubber or a mixture of rubber and fabric or the like, is substituted for the paper backing and the lead sheet on the type form is again subjected to pressure or heat and pressure, the offset blanket possessing as it does considerable resiliency permitting the surface metal on the non-type forming face portions of the lead sheet to flow so that they assume a well curved or swelled shape as shown at D, the type-forming depressions being shown at E.

The blanket or resilient backing sheet is then removed and while the thin lead sheet A is still on the type form, suitable bearers F, of proper height, which form a frame, are placed upon the frame F', or the chase which surrounds the type form. The edges of the lead sheet A are clamped between the frames F and F', as shown at G. A body of molten metal having preferably a lower melting point than the lead sheet is poured onto the lead sheet, preferably or approximately to the level of the top of the frame or bearers F to form the backing H for the lead mold-sheet. This metal for the backing may be, for instance, made up of two parts of tin and one part of lead. Before it is poured on the lead sheet A, the back of the latter is preferably coated with an acid to clean the same and thereby bring about a more intimate union of the lead sheet and the backing metal. For this purpose I preferably employ a saturated water solution of 90% chlorid of zinc and 10% chlorid of ammonium. Before this acid solution dries out or has allowed air to strike the surface of the lead sheet I preferably wipe the acid surface with a 5% solution of rosin and alcohol for the purpose of preventing steam formation when the hot backing metal is poured onto the lead sheet and also to provide a flux for bringing about a more intimate union of the backing metal with the sheet. After the cast backing hardens, I preferably but not necessarily, subject the mold or matrix to additional pressure against the type form to give deeper impressions at the face of the lead sheet, if this be desirable.

As a final step, if desired, the back face of the cast backing H is shaved or planed or otherwise leveled to give a smooth, even back face of predetermined dimensions, and the sides of the mold trimmed to bring them flush with the sides of the cast backing so that the complete mold appears as shown in Fig. 3.

The backing up operation for the lead sheet above described may be accomplished in various ways by utilizing various appliances, the manner herein described being to illustrate one simple and preferred way.

While I have herein shown and described one preferred embodiment of the invention, I wish it to be understood that I do not confine myself to all the precise details herein set forth, as modification and variation may be made without departing from the spirit of the invention or exceeding the scope of the appended claims.

What I claim is:

1. The herein described method of making a printing plate mold which consists in subjecting a sheet of moldable material to pressure in contact with a type body to form type forming depressions and non-type forming elevations in the sheet, and then applying a backing of molten material to the back of the above mentioned sheet, while the latter is still in contact with and supported throughout its entire area by the type body, and permitting the molten material to harden to form a solid and rigid cast flat back for the sheet.

2. The herein described method of making a printing plate mold which consists in electroplating a sheet of lead to provide a facing sheet, subjecting the facing sheet of moldable metal to pressure in contact with a type body to form type forming depressions and non-type forming elevation in such facing sheet, then coating the back of said sheet with a cleansing acid and then wiping the acid surface with a flux, and then applying a backing of molten metal to the back of said sheet and permitting said molten metal to harden to form a permanent backing for the sheet while such sheet is still in contact with and supported throughout its entire area by the type body.

In testimony whereof I affix my signature

EMIL E. NOVOTNY.